Figure 1:
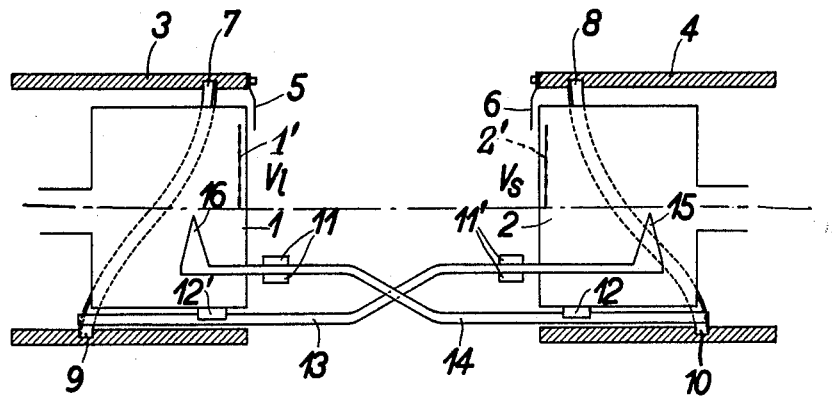

March 20, 1934.     S. J. VAN DEN BERGH     1,951,852

DEVICE FOR FIRE CONTROL APPARATUS

Filed June 21, 1932

Inventor:
Samuel Johannes van den Bergh

Patented Mar. 20, 1934

1,951,852

UNITED STATES PATENT OFFICE 1,951,852

DEVICE FOR FIRE CONTROL APPARATUS

Samuel Johannes van den Bergh, The Hague, Netherlands, assignor to the firm N. V. Nederlandsche Instrumenten Compagnie "Nedinsco," Venlo, Netherlands Application June 21, 1932, Serial No. 618,509
In the Netherlands September 26, 1931

2 Claims. (Cl. 235—61.5)

I have filed an application in the Netherlands, September 26, 1931.

The invention relates to fire control apparatus and concerns a device for the determination of the speed resulting from the two components of the speed of a target which are at right angles to each other. This device comprises two speedometers. Each of these speedometers has a cylindrical housing and a pointer so disposed in this housing as to be rotatable about the axis of the housing, the said pointer being adapted to rotate through an angle corresponding to one of the said components. The housings are surrounded by one concentrical drum each. Each of these drums, which may be rotated by hand relatively to, and about the axis of, the housing, has a pointer coordinated to the appertaining speedometer pointer, these two pointers representing a follow-the-pointer mechanism.

With a view to determining by means of a device of this kind the speed resulting from the said two components, I suggested in patent specification 1,859,725 to connect the two following-pointer drums to the two cross-slides of a coordinate transformer. I now have found out that the value of the resulting speed may be determined by means of a device which is less unwieldy and of smaller dimensions. This advantage is attained by so coupling the one of the two following-pointer drums to an indicating organ which lies against the exterior cylindrical surface of the other following-pointer drum and is displaceable relatively to, and in the direction of the axis of, this other drum, that a rotation of the first said drum relative to the appertaining speedometer housing entails a corresponding displacement of the indicating organ relative to the said other drum; and by providing on the said exterior cylindrical surface a system of curves of equal speeds referring to a cylinder-coordinate system whose one axis is the generatrix of the cylindrical surface and whose other axis is a circle resulting from the intersection of the cylindrical surface and a plane at right angles to the first said axis.

When a device constructed in the described manner is so adjusted as to make the indicating organ assume relatively to the said system of curves a position in which it indicates a point representing the resulting speed zero, that is to say when this system of curves is adjusted to the point at which the said two coordinate axes intersect, and, consequently, when each of the two following-pointer drums has that position (its zero position) in which the appertaining following pointer is adjusted relatively to the appertaining speedometer housing according to the value zero of the speed component pointed at on the speedometer, the indicating organ, regardless of how far the following pointer drums have been rotated from their zero positions, indicates at the curves the value of the speed resulting from the components according to which the following-pointer drums have been rotated.

To find the direction of the said resulting speed, use may be made of a device of equal construction, the only condition being that the system of curves consists of curves representing equal directions of speed.

The most simple construction of a device permitting to find the value as well as the direction of the said resulting speed is obtained by providing the two systems of curves on the exterior cylindrical surface of one and the same following-pointer drum. In this case, only one indicating organ is required. If more importance is attached to facilitating the reading than to simple construction, it is advisable to provide on the exterior cylindrical surface of the one following-pointer drum the one, and on the exterior cylindrical surface of the other following-pointer drum the other system of curves, which means that two indicating organs are required and, accordingly, two couplings which are adapted to displace the said indicating organs according to the rotations of the two following-pointer drums.

A specially suitable construction of the device is arrived at when the axes of the said two speedometers coincide and when each indicating organ coupled to one of the said two following-pointer drums forms part of a slide which is so disposed between guides as to be displaceable in the direction of these axes and engages by means of a pin or the like in a helical groove in one of the cylindrical surfaces of the appertaining following-pointer drum.

The accompanying drawing illustrates two constructional examples of a device according to the invention, a curve drum being concentrically coordinated to each of the two speedometers.

Figure 1 schematically represents one constructional example, in which the axes of the two speedometers coincide, in front elevation, partly in a view and partly in a section through these axes.

Figure 2:
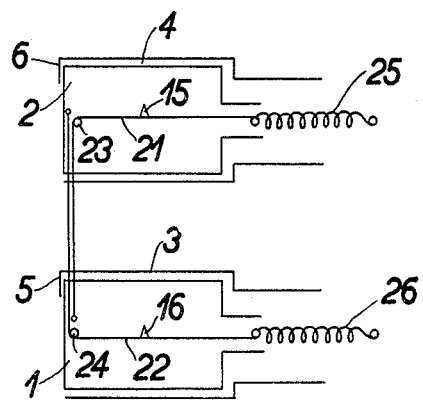

Figure 2 schematically represents another constructional example, in which the axes of the two speedometers are displaced parallel to each other.

Figure 3:
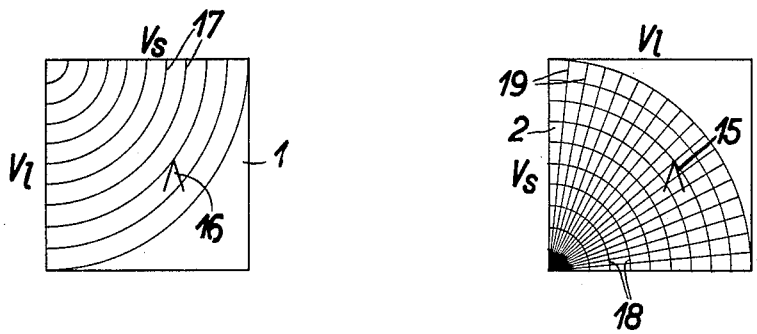

Figure 3 shows the surfaces of the two drums on a reduced scale and developed.

In Figure 1, 1 and 2 are the cylindrical housings of two speedometers. The axes of these housings coincide. 1' and 2' are the speedometer pointers, each of which is assumed to be driven by means of a mechanism, which is not represented in the drawing, according to one of the two components $v_l$ and $v_s$ of the speed of a target, these components being at right angles to each other.

The two housings 1 and 2 are surrounded by concentric drums 3 and 4, respectively. Each of these drums is so disposed on the appertaining housing as to be rotatable relatively to, and about the axis of, the housing. Pointers 5 and 6 are provided on the drums 3 and 4, respectively, each pointer being a following pointer coordinated to the appertaining speedometer pointer. The exterior cylindrical surface of the drum 3 is provided with curves 17 of equal speeds, these curves referring to a cylinder coordinate system whose one axis is the generatrix of the said cylindrical surface and whose other axis is the circle resulting from the intersection of the cylindrical surface and a plane at right angles to the first said axis. When this surface is developed (Figure 3), the curves 17 are concentric and equidistant circular arcs of 90° the centre of which corresponds to the speed zero. The indicating organ belonging to the curves 17 is a pointer 16 forming part of a slide 14 displaceable in the direction of the common axis of the housings 1 and 2, this displacement being effected in a guide 11 and a guide 12 which is fixed to the housing 2. A pin 10 of the slide 14 engages in a helical groove 8 in the interior cylindrical surface of the drum 4. The exterior cylindrical surface of the drum 4 is provided with curves 19 of equal directions of speed, these curves referring to a cylinder-coordinate system of the above-mentioned kind. When this surface is developed (Figure 3), the curves 19 are straight lines intersecting at one point, the straight line parallel to the axis common to the housings 1 and 2 corresponding to the angle of direction zero. The indicating organ belonging to the curves 19 is a pointer 15 forming part of a slide 13 displaceable in the direction of the axis common to the housings 1 and 2, this displacement being effected in a guide 11' and a guide 12' which is fixed to the housing 1. A pin 9 engages in a helical groove 7 in the interior cylindrical surface of the drum 3. The inclination of this groove is reverse to that of the groove 8. When, as shown in the drawing, the exterior cylindrical surface of the drum 4 is provided also with curves 18 corresponding to the curves 17 and representing equal speeds, the curves 17 on the drum 3 as well as the pointer 16, the slide 14, the guides 11 and 12, the pin 10 and the helical groove 8 may be dispensed with. In this case, the pointer 15 affords to read both the value and the direction of the sought resulting speed. When the exterior cylindrical surface of the drum 4 is developed (Figure 3), the curves 18 are concentric and equidistant circular arcs of 90° the centre of which corresponds to the speed zero and coincides with the point of intersection of the said straight lines 19.

To make the drawing not occupy too much space and to afford a clear illustration of the invention, the drums 3 and 4 as well as the grooves 7 and 8 are distorted in Figure 1. In this Figure 1, the pointers 15 and 16 are represented in positions different from those according to Figure 3. To correspond to the chosen forms of the curves 17, 18, 19, the drums are to be at least $\pi$ times as long as the diameters of their exterior cylindrical surfaces and, these surfaces being developed, the grooves 7 and 8 are to be inclined relatively to the common axis of the drums at an angle of 45°.

When in use, the speedometers 1, 1' and 2, 2' are to be so coupled to the shafts of a fire control apparatus or the like, whose angular speeds correspond to the speed components of a moving target $v_l$ and $v_s$ at right angles to each other, that their pointers 1' and 2' are turned according to these angular speeds. In this case, it is only necessary to so adjust the drums 3 and 4 by turning them by hand about their common axis that their following pointers 5 and 6 remain in coincidence with the speedometer pointers. When the drums 3 and 4 are being rotated in this manner, the slides 13 and 14, on account of their pins 9 and 10 extending into the helical grooves 7 and 8, are so displaced in the direction of the common axis of the drums that the pointers 16 and 15 permanently indicate at the curves 17 and 18 the value of the speed resulting from the said two components $v_l$ and $v_s$, and that the pointer 15 permanently indicates also the direction of this resulting speed.

In the constructional example according to Figure 2, the axes of the speedometer housings 1 and 2 and of the drums 3 and 4 are displaced parallel to each other. To impart to each of the two pointers 15 and 16 a displacement relative to that drum (4 and 3, respectively) which contains the appertaining curve system 18, 19 or 17 (not represented in the drawing) when the other drum 3 or 4 is rotated, the pointer 15 is connected by means of a cord 21 to the drum 3, while the pointer 16 is connected by means of a cord 22 to the drum 4. The cords 21 and 22 run over rollers 23 and 24, respectively, and are kept taut by means of springs 25 and 26, respectively.

The drums 3 and 4 may be connected to the pointers 15 and 16 as well by any other known coupling means, for instance by toothed wheels, racks, levers, or the like. The speedometer housings 1 and 2 may be so disposed relatively to each other that their axes embrace an angle other than the angle zero.

I claim:

1. In fire control apparatus, a device for the determination of the speed resulting from the two components of the speeds of a target which are at right angles to each other, this device comprising two speedometers, each of these speedometers containing a cylindrical housing, a pointer being so disposed in each housing as to be rotatable about the axis of the housing, this pointer being adapted to rotate about an angle corresponding to the one of these two components, each housing being surrounded by a concentrical drum, this drum being rotatable by hand relatively to, and about the axis of, the housing and having a pointer coordinated to the appertaining speedometer pointer, these two pointers representing a follow-the-pointer mechanism, the exterior cylindrical surface of one of these drums being provided with a system of curves representing values of speed, an indicating organ belonging to this system of curves, this indicating organ lying against the exterior cylindrical surface of that drum which is provided with the appertaining system of curves and being displaceable relatively to this drum in the direction of the axis of rotation of the same, and means for so coupling this indicating organ to the other drum that rotating this other drum relatively to the appertaining housing entails a displacement of the indicating organ relative to the appertaining drum.

2. In fire control apparatus, a device for the determination of the speed resulting from the two components of the speed of a target which are at right angles to each other, this device comprising two speedometers, each of these speedometers containing a cylindrical housing, the axes of the two housings coinciding with each other, a pointer being so disposed in each housing as to be rotatable about the axis of the housing, this pointer being adapted to rotate about an angle corresponding to the one of these two components, each housing being surrounded by a concentrical drum, this drum being rotatable by hand relatively to, and about the axis of, the housing and having a pointer coordinated to the appertaining speedometer pointer, these two pointers representing a follow-the-pointer mechanism, the exterior cylindrical surface of one of these drums being provided with a system of curves representing values of speed, an indicating organ belonging to this system of curves, this indicating organ lying against the exterior cylindrical surface of that drum which is provided with the appertaining system of curves and forming part of a slide, this slide being so disposed between guides as to be displaceable in the direction of the coinciding axes of the said housings and engaging by means of a pin in a helical groove in one of the cylindrical surfaces of the other drum.

SAMUEL JOHANNES VAN DEN BERGH.